United States Patent [19]

Tison

[11] Patent Number: 4,882,018

[45] Date of Patent: Nov. 21, 1989

[54] ELECTROLYTIC DEMETALLIZATION OF DILUTE SOLUTIONS USING ION EXCHANGE RESINS

[75] Inventor: Richard P. Tison, Pontiac, Mich.

[73] Assignee: General Motors Corporation, Detroit, Mich.

[21] Appl. No.: 178,032

[22] Filed: Apr. 5, 1988

Related U.S. Application Data

[63] Continuation-in-part of Ser. No. 28,387, Mar. 20, 1987, abandoned.

[51] Int. Cl.$^4$ ................................................. C25C 1/00
[52] U.S. Cl. .................................. 204/105 R; 204/112; 204/149; 204/186
[58] Field of Search ............... 204/130, 151, 149, 186, 204/112, 105 R; 210/243, 670

[56] References Cited

U.S. PATENT DOCUMENTS

| | | | |
|---|---|---|---|
| 2,912,372 | 11/1959 | Stoddard | 204/151 |
| 3,005,763 | 10/1961 | Kollsman | 204/151 |
| 3,006,828 | 10/1961 | Gaysowski | 204/151 |
| 3,074,863 | 1/1963 | Jastonowski | 204/151 |
| 4,004,994 | 1/1977 | Andrus | 204/149 |
| 4,248,684 | 2/1981 | Doniat | 204/149 |
| 4,310,406 | 1/1982 | Smith et al. | 204/149 |

OTHER PUBLICATIONS

J. R. Parris, *Electrical Conductance of Particles of Ion-Exchange Resin*, J. Chemical Soc., 1962, pp. 612–617.

M. C. Sauer, Jr., P. F. Southwick, K. S. Spiegler and M. R. J. Wyllie, Electrical Conductance of Porous Plugs, Indus. & Engring. Chem., vol. 47, No. 10, Act. 1955, pp. 2187–2193.

G. S. Solt, *Electrodialysis*, Membrane Separation Processes, P. Meares, Ed., Elsevier Scientific Publishing Co., N.Y., 1976, pp. 258–259.

*Primary Examiner*—John F. Niebling
*Assistant Examiner*—Steven P. Marquis
*Attorney, Agent, or Firm*—Lawrence B. Plant

[57] ABSTRACT

Process for the efficient, electrolytic scavenging and depositing of metal from dilute aqueous solutions thereof by performing such process in a packed bed of strongly acidic, cation exchange resin particles flooded with the solution. The particles contact the cathode in a quiescent layer of the solution contiguous the cathode.

1 Claim, 3 Drawing Sheets

ELECTROLYTIC DEMETALLIZATION OF DILUTE SOLUTIONS USING ION EXCHANGE RESINS

This application is a continuation-in-part of U.S. Ser. No. 028,387, filed Mar. 20, 1987, now abandoned.

This application relates to a process for the electrolytic scavenging of metal from a dilute aqueous solution thereof, and more particularly to the use of ion exchange resins in such processes.

BACKGROUND OF THE INVENTION

Large quantities of dilute waste waters resulting from a variety of industrial operations (e.g., electroplating) can often be electrochemically treated to detoxify them or to recover valuable metals therefrom before discharge to the environment. Likewise, electrolytic purification processes may be used to provide substantially metal-free process waters needed for a variety of industrial applications. However, reactors built for the electrochemical scavenging and deposition of dissolved metals from dilute, aqueous solutions thereof tend to suffer from poor electrical conductivity, low reaction (i.e., metal deposition) rates, poor metal deposition current efficiency, and low quality metal deposits. Poor electrical conductivity results from too few ions to carry current passed through the solution. Poor metal deposition current efficiency results from a substantial proportion of the current being wastefully consumed on alternate and competitive reactions (e.g., hydrogen gassing) which occur at the cathode simultaneously with metal deposition. Low metal deposition rates result from limited mass transport of metal ions to the cathode (i.e., poor diffusional and electrical transport of metal ions through the solution). Low quality (e.g., impure, dendritic, etc.) deposits result both from the limited ability of the dilute aqueous solution to supply metal ions to the cathode, and from the affects of the competing reactions (e.g., $H_2$ evolution and a related pH increase) especially at high cathode current densities. Though the electrical conductivity of such solutions can be improved by adding additional dissolved electrolytes (i.e., other than the metal sought to be deposited—e.g., acids) to each batch of water to be treated, such additional electrolytes: (1) require replacement; (2) are themselves often discharged into the environment or undesirably end up in the process water; and (3) do not significantly improve deposition current efficiency or deposition rate.

It would be desirable to improve such electrolytic metal scavenging/deposition process by means of a non-consumable ingredient which would improve deposition rates, deposition current efficiency (i.e., for lower energy consumption per pound of metal scavenged) and provide more uniform and higher quality metal deposits especially at the higher deposition rates.

It is an object of the present invention to provide an improved, more cost effective and energy efficient process for scavenging and depositing good quality metal from dilute aqueous solutions thereof at relatively high rates and current efficiencies.

This and other objects and advantages of the present invention will become more readily apparent from the detailed description thereof which is given hereafter in conjunction with the several Figures in which.

Figure 3:
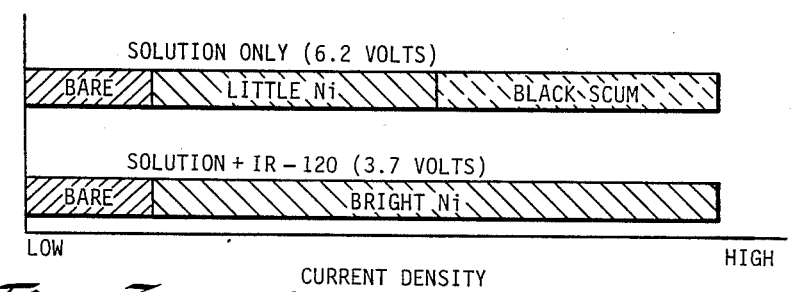
Figure 4:
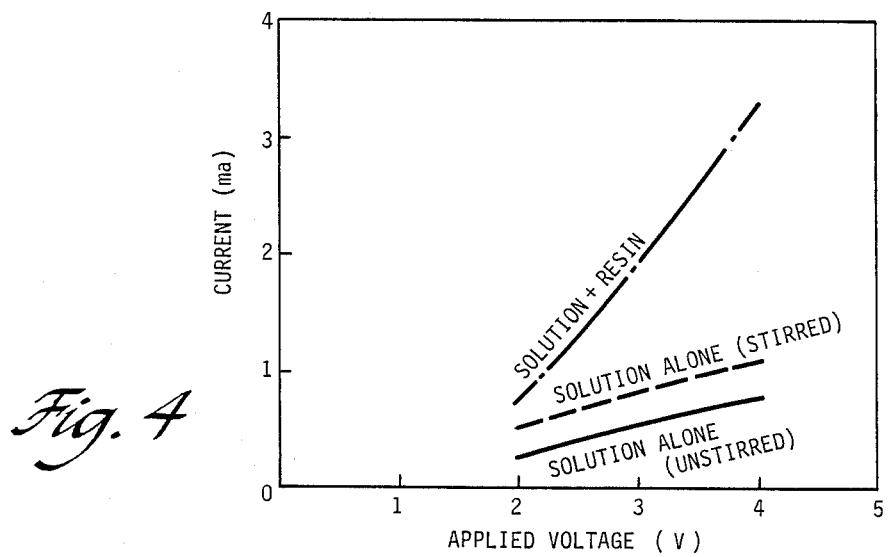
Figure 5:
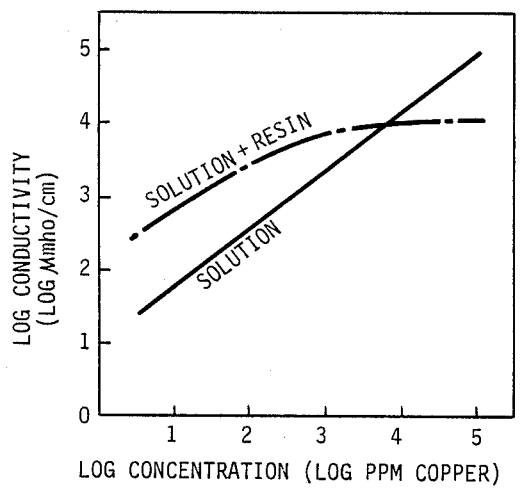
Figure 6:
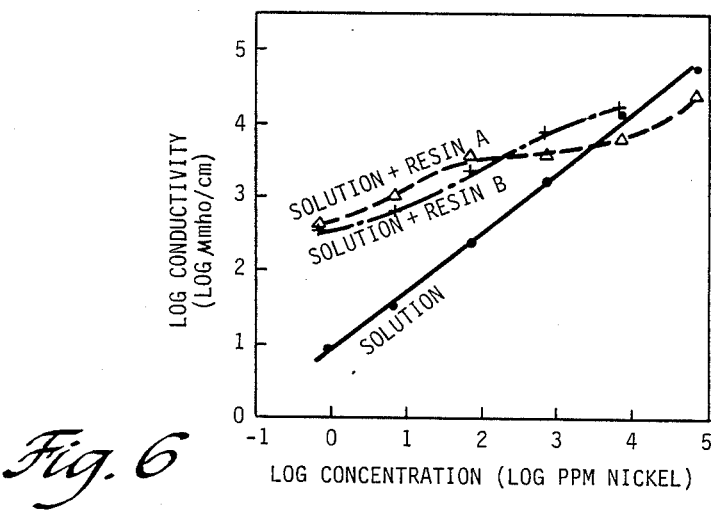

FIG. 3 graphically depicting the nature of the metal deposited at various current densities with and without resin present;

FIG. 4 is a current-voltage plot comparing the affects of resin and agitation on a dilute copper-containing solution;

FIG. 5 is a plot of the conductivities of a copper solution with and without resin as a function of copper concentration;

FIG. 6 is a plot similar to FIG. 5 but for nickel-containing solutions; and

Figure 7:
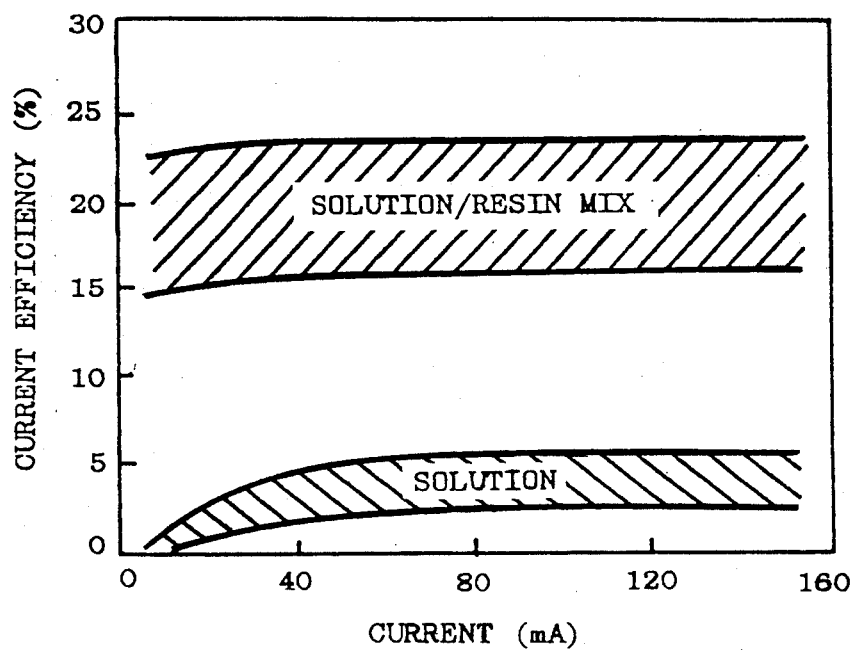

FIG. 7 is a plot of current efficiency versus current for nickel-containing solutions with and without resin present.

BRIEF DESCRIPTION OF THE INVENTION

The present invention comprehends a method for the electrolytic scavenging and deposition of dissolved multi-valent metal from dilute, aqueous solutions thereof including: contacting the solution with a pair of electrodes (i.e., anode and cathode); providing a packed bed of strongly acidic, cation exchange resin particles in the solution between the electrodes, which resin is substantially saturated with, and highly conductive with respect to, the metal sought to be scavenged; maintaining a substantially quiescent layer of said solution contiguous the cathode; and impressing a voltage upon the electrodes in such direction as to cathodize one of the electrodes (i.e., the cathode) relative to the other and in sufficient magnitude to deposit the metal onto the cathode. The invention is particularly effective with solutions which are poorly conductive and dilute with respect to the metal cation sought to be deposited. By substantially quiescent layer is meant a layer of solution contiguous the cathode which is sufficiently stagnant as not to substantially mix with the bulk of the solution more remote from the cathode. It is believed that the solution contiguous the resin where the mobile, cations exit the resin, is enriched in metal cations especially at the resin-cathode interface where a layer of cation enriched (i.e., relative to the bulk solution) solution serves to improve the metal deposition rate, quality of the deposit obtained, and current efficiency of the electrodeposition process occurring at the cathode surface. Hence keeping this layer from mixing with the bulk electrolyte (i.e., quiescent) keeps the cation concentration therein relatively high which in turn accounts for the results obtained. The resin is believed to selectively take up and preferentially transport the multi-valent metal cations (i.e., as compared to hydrogen ions) and thereby not only improves the conductivity of otherwise poorly conductive solutions but, more importantly, so improves total mass transport of the metal cations through the solution-resin mix so as to significantly improve deposition current efficiency, reduce hydrogen gassing, increase metal deposition rates (i.e., without deposit degradation) and reduce energy consumption per pound of metal scavenged from the solution.

The term ion exchange resin as used herein refers to a solid organic material having a matrix with fixed ions (i.e., chemically bound functional groups) and oppositely charged mobile counterions which can be exchanged reversibly with ions of like charge from a surrounding liquid medium. The mobile counterions within the resin provide ionic, electrical conductivity, and correspondingly electrically driven mass transport, within the resin which is largely fixed and substantially independent of the surrounding solution. When an ion exchange material of high counterion capacity, and correspondingly high electrical conductance, is intermixed with a poorly conductive solution the net conductivity of the solution-resin mix is increased. When the counterion is a multi-valent metal cation and the surrounding solution is dilute with respect to that cation the proportion of current flow attributable to that counterion in the resin is increased which, in turn, increases the deposition current efficiency and reduces the electrical energy consumed per kilogram of metal scavenged from the dilute solution. By "highly conductive" resin is meant a resin which, when substantially saturated with the metal sought to be scavenged, has an electrical conductance attributable to the metal cation therein which is greater than the conductance of the surrounding, dilute solution attributable to the same metal cation therein. The expression "strongly acidic" cation exchange resin is used in the sense well known to those skilled in the ion exchange art and generally relates to those phenolic condensation or addition products containing functional groups derived from strong acids which have proven useful for the reversible exchange of cations. Strongly acidic, gel-type, cation exchange resins which have a matrix of styrene and divinyl benzene with sulfonic acid functional groups have proven to be particularly effective for use with the present invention. Such resins: (1) have a relatively high take-up affinity for the more common multi-valent metals found in waste waters, or other waters requiring demetallization; (2) are effective over a broad range of pH's; and (3) have demonstrated higher levels of metal ion electrical transport than the dilute metal-containing solutions with which they have been used.

The resin particles (e.g., granules or beads, spheres) forming the packed bed can vary in size from about 40 micrometers to about 1.2 millimeters in diameter (i.e., 400–16 mesh). The particular size chosen for any given application will vary with the particular application and will involve certain tradeoffs. Ideally the particles will be as small as possible for maximum ion exchange with the surrounding solution. On the other hand, the particle size must be sufficiently large as to insure practical containment of the particles within the reactor. For all practical purposes it seems that the particles should be at least about 0.2 millimeters in diameter in order to insure effective containment in a continuous, flow-through reactor.

In accordance with the present invention, the ion exchange resin will initially be substantially saturated with the metal ion sought to be scavenged. This may conveniently be accomplished by simply soaking the virgin resin in the solution to be demetallized (or a similar solution made up for that purpose) for a period of time sufficient to exchange the metal ions in the solution with the exchangeable, mobile, counterions (i.e., $H^+$) in the resin. In this regard, it should be noted that when a cation exchange resin is immersed in a solution, the resin will preferentially take up multi-valent metal cations sought to be scavenged but will also take up other ions as well in accordance with a thermodynamic equilibrium between the resin and the solution. Hence, an ion exchange resin herein is said to be "saturated" when it takes up substantially all of the metal cations it can when in substantial equilibrium with the solution being treated which in practice is less than the maximum number of metal cations it could theoretically contain based on the number of available exchange sites within the resin.

In addition to the reduced hydrogen gassing, improved current efficiency and higher metal deposition rate obtained, the process of the present invention produces a more uniform deposit distribution (i.e., leveling) across the face of the cathode. Leveling of the deposit: (1) makes production control of the process much simpler; and (2) permits the use of higher overall deposition rates (i.e., than heretofore possible with the solution alone) before deposit burning occurs which, in turn, increases the demetallization rate. The theory underlying the improved leveling obtained during DC current flow in the presence of the resin is not completely understood.

The resin is most effective in solutions dilute with respect to the metal cation sought to be deposited, since the effectiveness thereof (i.e., to increase current efficiency) decreases as the concentration of the metal cation in the solutions used therewith increases. One way of estimating the benefit one might expect from the use of resins in a particular solution is to determine the ratio of the conductance of the resin-solution mix attributable to the metal cation to the conductance attributable to the metal cation of the solution alone. Where dilute solutions are involved, the resin-solution/solution conductance ratio will be greater than unity. The higher the ratio above unity, the more current efficiency improvement is to be expected.

EXAMPLES & TESTS

Two strongly acidic and two weakly acidic cation exchange resins as well as one anion exchange resin were each tested using both electrode panels and wires in separate solutions containing copper ions and nickel ions, respectively, at various concentrations levels. The two strongly acidic resins, i.e. Amberlyte IR-120 and Dowex HGR-W2, both contained sulfonate functional groups and provided enhanced conductivity and current efficiency, more uniform current density distribution, and higher current density deposit burning thresholds than the weakly acidic cation exchange resins and the anion exchange resin. Amberlyte IR-120 resin is sold by the Rohm and Haas Company and is characterized as a strongly acidic, sulfonated polystyrene cation exchange resin having a medium porosity, $RSO_3-H^+$, and the following properties:

| | |
|---|---|
| Apparent Density (average) | 0.77 g/mL |
| Mesh Size (wet) | 20-50 mesh |
| Void Volume | 3-40% |
| Degree of Regeneration | 98% min. |
| Moisture Holding Capacity | 52% |
| Total Exchange Capacity | |
| Volume | 1.75 meq./mL min. |
| Weight (dry) | 5.0 meq./g min. |

Dowex HGR-W2 resin is sold by the Dow Chemical Company and is said to have been made from the sulfonation of styrene-divinyl benzene copolymer beads and has the following properties:

| Form | Na+ Form | H+ |
| --- | --- | --- |
| Specific gravity | 1.31 | 1.22 |
| Standard Screen Size (wet) | | |
| on 16 mesh, max | 2% | 2% |
| through 40 mesh, max | 1% | 1% |
| Screen Index Range | 300–450 | 300–450 |
| Water Retention Capacity | 40–43% | 47–50% |
| Minimum Capacity | | |
| meq./g dry resin | 4.35 | 4.75 |
| meq /mL wet resin | 2.2 | 2.0 |
| kg/cu. ft. as calcium carbonate | 48.0 | 43.6 |

The two weakly acidic resins (i.e., Amberlyte DP-1 and IRC-84), both contained carboxyl functional groups and, though effective to some extent, performed considerably worse than the strongly acidic resins. The anion exchange resin, Amberlyte IRC-400, was a strongly basic quaternary ammonium-type resin which improved the conductivity of the solution only somewhat but worsened the character of the deposit formed.

A number of Hull cell tests were conducted at about room temperature using a 200 milligram/liter $CuSO_4$ solution and a diluted Watt's nickel plating bath. The Watt's nickel plating bath used, prior to dilution, comprised 272 grams per liter $NiSO_4.6H_2O$, 44 grams per liter $NiCl_2.H_2O$, and 30 grams per liter boric acid. The Hill cell comprised a miniature trapezoidal-shaped plating tank with an anode laid against the right angled side and a 100 millimeter wide×70 millimeter high cathode laid against the sloping side to provide controlled electroplating over a known, wide range of current densities simultaneously. In these tests the cathode was segmented into three separate sections (33 millimeters wide×70 millimeters high) each of which was provided with a separate ammeter so that the current distribution could be measured.

Figure 1:
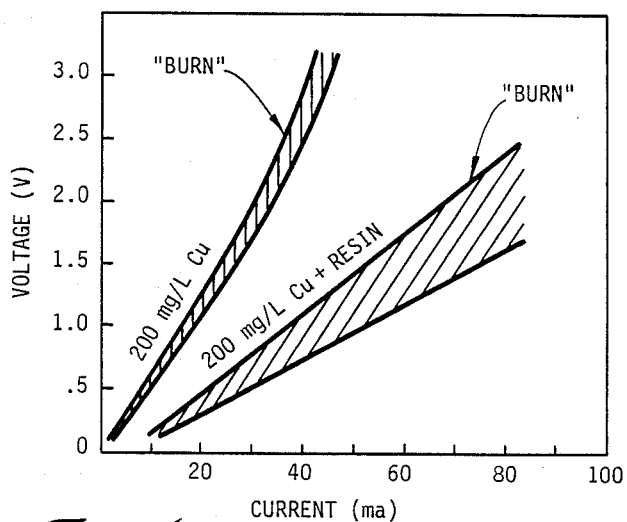
FIG. 1 is a current-voltage plot comparing dilute, copper-containing solutions with and without resin present.

FIG. 1 is voltage-current plot for electrolytically scavenging metal onto cathode panels (oscillating at about 30 cycles/min.) from a dilute solution containing 200 milligrams per liter (mg/L) of copper sulfate both with and without a packed bed of Amberlyte IR-120 cation exchange resin. The plot shows that the presence of a packed bed of resin substantially increased the maximum current that could be applied before reaching the burn or degradation threshold of the deposit.

Figure 2:
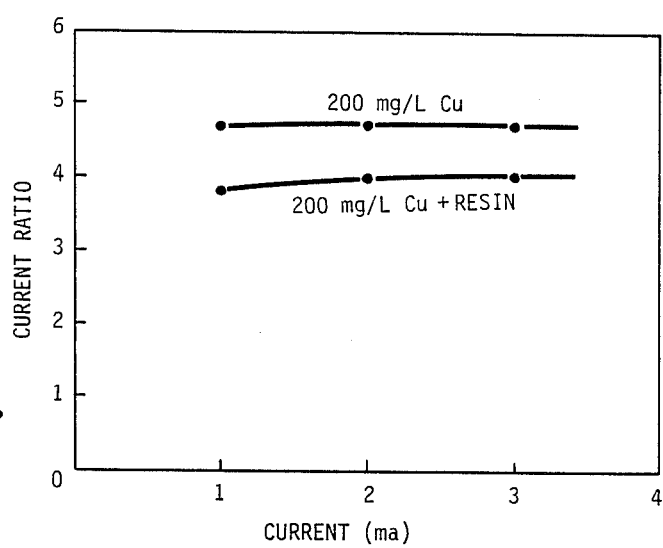
FIG. 2 is plot of the current ratio versus the current indicative of the current density leveling achievable by the present invention with the same solutions as FIG. 1.

FIG. 2 depicts the results of a standard Haring-Blum throwing power test (i.e., 5:1 anode placement) and shows that the presence of a packed bed of Amberlyte IR-120 cation exchange resin provides a more uniform current (therefore a more uniform deposit) as reflected by the smaller ratio obtained between the high and low current cathode segments of the test panel.

FIG. 3 graphically depicts the results of a Hull cell test performed at 50 milliamps for five minutes using a 100:1 diluted Watt's (272 g/l $NiSO_4.6H_2O$, 44 g/l $NiCl_2.H_2O$ and 30 g/l boric acid) nickel plating bath (pH 3.5). 6.2 volts was required to drive the 50 ma through the resin-free solution while only 3.7 volts was required to drive the 50 ma through the solution-resin mix. FIG. 3 shows that a bright nickel deposit was obtained over a far wider current density range and at significantly less voltage utilizing a solution filled with Amberlyte IR-120 cation exchange resin. Electroplating studies with this same dilute solution and resin demonstrated that bright nickel deposits were obtained only when convective mixing between the solution adjacent to the cathode/resin interface region and the bulk of the dilute solution was minimized. When bulk solution was allowed (using a pump), to even gently flow though the beads adjacent to the cathode, degradation of the nickel deposit resulted.

FIG. 4 is a current-voltage plot showing the results of initial, crude, relative conductance tests using simple wire electrodes to show the comparison between (1) an unstirred copper sulfate solution alone, (2) a stirred copper sulfate solution alone and an unstirred solution filled with a strongly acidic resin in accordance with the present invention. FIG. 4 shows that the inclusion of a strongly acidic resin in the dilute copper sulfate solution allowed direct current electrolysis to occur under substantially less voltages than both the stirred and unstirred solutions alone. Related tests have shown that the conductivity of the solution-resin mix increases in direct proportion to the concentration of the resin particles in the solution and that maximum conductivity is achieved when the particles substantially completely fill the interelectrode gap essentially in the form of a packed bed.

In another test, copper electrodeposition was conducted in a 267 milli-liter Hull cell using 100 milliamps total current over the three segment cathode. A simulated industrial waste water, i.e., 56 parts per million copper (as copper sulfate), was evaluated both with and without Amberlyte IR-120 ion exchange resin present. The segmented cathode had separate ammeters attached to each of the segments. The test demonstrated that current distribution across the cathode was much more uniform when using the solution-resin mix than with the solution alone. In this regard, current densities on the high current, moderate current, and low current portions of the segmented cathode (i.e., expressed as multiples of the current density on the low current density portion) were 7.9/2.6/1.0 with the solution alone and 3.8/2.2/1.0 with the solution-resin mix. In addition to the substantially uniform current distribution obtained across the cathode, the total voltage requirement was reduced from 17 volts for the solution alone to only 7 volts for the solution-resin mix.

In addition, a number of other tests were performed using various concentrations of either a copper sulfate solution or Watt's nickel electroplating solution appropriately diluted. Conductivity measurements were made using a Cole-Parmer Model 1481-00 digital conductivity meter. Each solution/resin sample was placed in a test tube filled one-third with resin and two-thirds with solution such that the resin-solution mix resided at the bottom of the test tube. Conductivity measurements of the "solution only" was obtained by holding the conductivity dip cell in the solution above the solution-resin mix and conductivity measurements of the solution-resin mix were obtained by simply moving the dip cell to the bottom of the test tube. In each case, the resin added to the solution in the test tubes was first equilibrated with the solution by stirring of the resin in fresh solution until the resin was substantially saturated with the cation sought to be scavenged. FIG. 5 shows the conductivities obtained from the various copper sulfate solutions while FIG. 6 shows the same for the various nickel solutions tested. For both the copper and nickel solutions alone, there was a nearly straight line relationship between the concentration and conductivity. In both instances, however, the solution-resin mixes demonstrated substantial increases in conductivity at the lower concentration levels and a decrease in solution conductivity at the highest concentration levels. As shown in FIG. 5, a neutral, point of transition occurred at a concentration of about 4500 ppm copper (8900 umho/cm slurry conductivity). Hence, a very effective conductivity enhancement is demonstrated to occur at the more dilute solutions providing a three times, eight times and 11 times conductivity enhancement factor compared to the solution alone for concentrations of 820, 60 and 17 ppm copper, respectively. As shown in FIG. 6, the presence of the resin in this more complex solution demonstrates a more undulating curve than was observed with the copper sulfate for both the Dowex HGR-W2 (Resin A) and the Amberlyte IR-120 (Resin B). While the reasons for the undulations in the curves are not known, the broad trend observed is essentially the same as that observed for the copper sulfate in that the conductivity of the more dilute solutions was substantially enhanced.

In another test, shown in FIG. 7, electroplating studies were performed from a 100:1 diluted Watt's nickel bath adjusted to pH 1.5 with sulfuric acid. Conductivity of the solution alone was 0.29 Mhos/cm; conductivity of the solution/IR-120 resin mix was 0.26 Mhos/cm. Current efficiency for nickel recovery of only about four percent resulted from the use of the diluted Watt's bath alone, as most current was consumed in a hydrogen gassing reaction. Current efficiency was increased to about 20 percent when the bath was filled with Amberlyte IR-120 cation exchange resin. With the resin present much less current was consumed in co-evolution of hydrogen. This test also resulted in a deposition efficiency of 0.22 g nickel/A.h with the resin, compared to only 0.04 g nickel/A.h using the solution alone. Hence, though the conductivity of the solution was not enhanced, the current efficiency resulting from the use thereof was dramatically improved.

Using these same diluted and pH-adjusted nickel solutions with the Blum-Haring throwing power test, uniformity of metal distribution was determined. Using a 5:1 standard anode placement and 60 mA total current, the ratio of nickel deposited on the near and far cathode segments was 5.6:1 with resin, but infinity without the resin (no nickel deposit could be detected on the far cathode). This improvement with resin apparently is due to the ability of the ion-exchange resin to maintain current efficiency down to very low currents whereas without resin, current efficiency was observed (in FIG. 7) to drop off severely at low currents.

Finally, tests indicate that while the presence of resin in the solutions improves conductivity, the slope of the current-voltage curve decreases as current increases and a distinct knee in the current density versus voltage plot is obtained. This phenomena suggests that some form of concentration polarization is occurring within the particle bed. In this regard, it is reasoned that due to mass transport limitations in the solution, increases in applied current results in a lowering of the cation concentration at the solution-resin interface where the cation enters the resin thus increasing resistance locally, and shifting current to more conductive sites adjacent to the cathode. This may partially explain the improved leveling of the deposit observed. Subjecting the same solution-resin mix to an applied voltage which is manually switched back and forth between the forward and reverse directions at a cycle rate of approximately one cycle per second, eliminated the knee in the curve otherwise obtained and resulted in a substantially linear current density-voltage plot.

While the invention has been disclosed primarily in terms of specific embodiments thereof it is not intended to be limited thereto but rather only to the extent set forth hereafter in the claims which follow.

The embodiments of the invention in which an exclusive property or privilege is claimed are defined as follows:

1. A method for the electrolytic scavenging of dissolved metal from a dilute, aqueous solution containing cationic species of said metal and depositing said metal onto a cathode contacting said solution comprising the steps of:

disposing said solution between said cathode and an anode in an electrochemical cell;

providing a packed bed consisting essentially of strongly acidic, cation exchange resin particles in said solution so as to contact said cathode, said particles being substantially saturated with said species so as to have an electrical conductance attributable to said species which is greater than the electrical conductance of said solution attributable to said species;

maintaining a substantially quiescent layer of said solution contiguous said cathode;

impressing a voltage between said anode and cathode of sufficient magnitude to deposit said metal onto said cathode; and passing sufficient current between said anode and cathode to deposit said metal on said cathode;

whereby the deposition current efficiency, of the solution-bed mix exceeds that of said solution alone, the energy consumed per kilogram of said metal deposited is reduced, higher metal deposition rates are achieved, and improved deposit quality at said rates is obtained.

* * * * *